(12) United States Patent
Gao et al.

(10) Patent No.: US 12,008,985 B2
(45) Date of Patent: Jun. 11, 2024

(54) NATURAL LANGUAGE PROCESSING OF DECLARATIVE STATEMENTS

(71) Applicant: Amazon Technologies, Inc., Seattle, WA (US)

(72) Inventors: Qiaozi Gao, San Mateo, CA (US);
Divyanshu Brijmohan Verma, London, WA (US); Govindarajan Sundaram Thattai, Fremont, CA (US); Qing Ping, Santa Clara, CA (US); Joel Joseph Chengottusseriyil, San Jose, CA (US); Ivan Vitomir Stojanovic, Vancouver (CA); Feiyang Niu, Hayward, CA (US); Gokhan Tur, Los Altos, CA (US); Charles J Allen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 423 days.

(21) Appl. No.: 16/907,680

(22) Filed: Jun. 22, 2020

(65) Prior Publication Data
US 2021/0398524 A1   Dec. 23, 2021

(51) Int. Cl.
| G10L 15/22 | (2006.01) |
| G10L 15/18 | (2013.01) |
| G10L 15/26 | (2006.01) |
| G10L 13/08 | (2013.01) |

(52) U.S. Cl.
CPC ...... *G10L 15/1815* (2013.01); *G10L 15/1822* (2013.01); *G10L 15/22* (2013.01); *G10L 15/26* (2013.01); *G10L 13/08* (2013.01); *G10L 2015/223* (2013.01); *G10L 2015/225* (2013.01);
(Continued)

(58) Field of Classification Search
None
See application file for complete search history.

(56) References Cited

U.S. PATENT DOCUMENTS

| 8,682,667 B2* | 3/2014 | Haughay | G10L 17/08 |
| | | | 704/251 |
| 9,922,642 B2* | 3/2018 | Pitschel | G10L 15/22 |
| 10,460,215 B2* | 10/2019 | Herold | H04N 5/23219 |

(Continued)

FOREIGN PATENT DOCUMENTS

EP    3392878    10/2018

OTHER PUBLICATIONS

Author unknown; International Search Report and Written Opinion of PCT/US2021/033877; dated Sep. 22, 2021; 12 pgs.

*Primary Examiner* — Richard Z Zhu
(74) *Attorney, Agent, or Firm* — K&L Gates LLP

(57) ABSTRACT

Devices and techniques are generally described for learning personalized responses to declarative natural language inputs. In various examples, a first natural language input may be received. The first natural language input may correspond to intent data corresponding to a declarative user input. In some examples, a dialog session may be initiated with the first user. An action intended by the first user for the first natural language input may be determined based at least in part on the dialog session. In various examples, first data representing the action may be stored in association with second data representing a state described by at least a portion of the first natural language input.

16 Claims, 8 Drawing Sheets

(52) U.S. Cl.
CPC .. *G10L 2015/227* (2013.01); *G10L 2015/228* (2013.01)

(56) References Cited

U.S. PATENT DOCUMENTS

| | | | |
|---|---|---|---|
| 10,546,023 B2* | 1/2020 | Ni | G10L 15/18 |
| 11,164,562 B2* | 11/2021 | DiMascio | G10L 15/22 |
| 2011/0208524 A1* | 8/2011 | Haughay | G10L 17/08 |
| | | | 704/E15.001 |
| 2014/0324429 A1* | 10/2014 | Weilhammer | G10L 15/1815 |
| | | | 704/244 |
| 2015/0032443 A1* | 1/2015 | Karov | G06F 40/30 |
| | | | 704/9 |
| 2015/0039292 A1* | 2/2015 | Suleman | G06F 40/216 |
| | | | 704/9 |
| 2017/0133009 A1* | 5/2017 | Cho | G10L 15/22 |
| 2018/0233141 A1* | 8/2018 | Solomon | G01S 5/18 |
| 2019/0361978 A1* | 11/2019 | Ray | G06F 40/30 |
| 2020/0243074 A1* | 7/2020 | Taki | G10L 15/1815 |
| 2020/0310749 A1* | 10/2020 | Miller | G06F 9/4881 |

* cited by examiner

NATURAL LANGUAGE PROCESSING OF DECLARATIVE STATEMENTS

BACKGROUND

Automatic speech recognition (ASR) combined with language processing techniques may enable a computing device to retrieve and process commands from a user based on the user's spoken commands. Natural language processing can be used to translate the spoken requests into semantic interpretations of the spoken command. Executable instructions are generated based on the semantic interpretation of the spoken command. The executable instructions are executed and a corresponding task is performed. Such speech processing and voice control may be used by personal computers, hand-held devices, telephone computer systems, and a wide variety of other computing devices to improve human-computer interactions and to control various systems.

DETAILED DESCRIPTION

Figure 1:
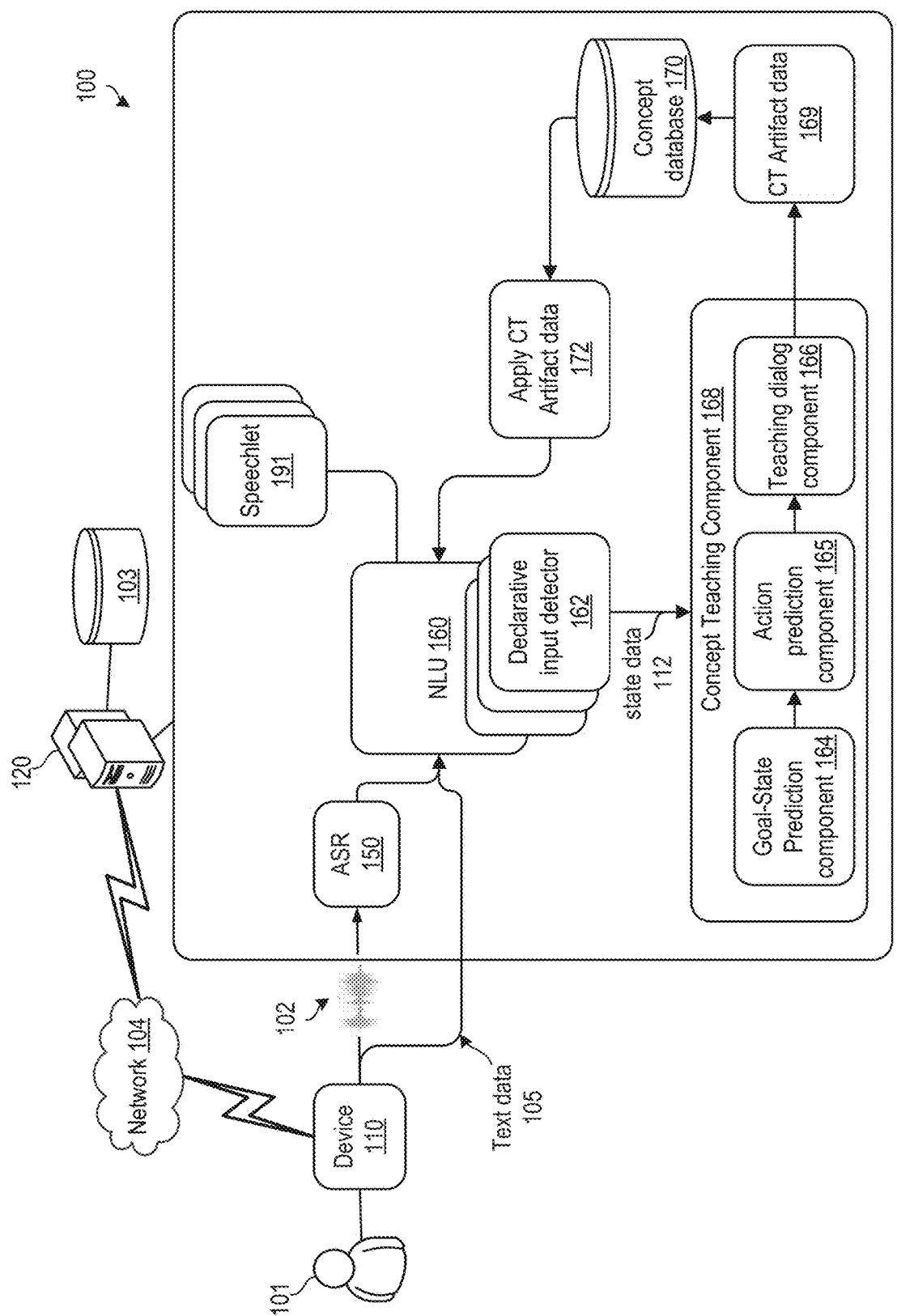
FIG. 1 is a diagram of a system configured to determine an executable action in response to a declarative natural language input, according to various embodiments of the present disclosure.

In the following description, reference is made to the accompanying drawings that illustrate several examples of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

Automatic speech recognition (ASR) is a field of computer science, artificial intelligence, and linguistics concerned with transforming audio data associated with speech into text data and/or other ASR output data representative of that speech. Natural language understanding (NLU) is a field of computer science, artificial intelligence, and linguistics concerned with enabling computers to derive meaning from text input containing natural language. In many examples, the natural language input data (e.g., a user utterance and/or input text) may result in specific semantic intent data representing a semantic interpretation of the text. In some examples, the semantic intent data is actionable to cause the natural language processing system and/or a natural language processing application (e.g., a "skill," a "speechlet," etc.) to perform an action. For example, the semantic intent data may include executable commands or other type of instructions. Thereafter one or more of the semantic intents may be selected for further processing and/or output by the NLU system. For example, the semantic intent associated with the highest confidence score among the different semantic intents generated may be selected for further processing and/or output.

In some examples, there may be different natural language processing domains. A natural language processing domain may be, for example, a set of natural language processing intents and/or speechlets, NLU models that are grouped together as a domain for the purpose of handling a particular type of natural language processing task. For example, there may be a shopping domain related to making purchases and/or navigating an e-commerce system using natural language commands. In another example, there may be a music domain related to controlling music playback using natural language commands. Various other domains may be used according to the specific implementation of the natural language processing system.

In various examples, domain-specific intents may be defined for natural language inputs that are declarative in nature and that do not request an action that is directly understood by the natural language processing system. For example, a natural language input that is declarative may be an input that does not include a specific question to be answered and/or command that is able to be carried out by the natural language processing system in its current state. In some examples, declarative user utterances, such as "computer, it's cold in here" and/or "computer, I'm tired" may be examples of natural language inputs that are not directly actionable. For example, there may not be any action requested and/or command included in the declarative statement "it's cold in here." Accordingly, the semantic intent for such a user statement may not be associated with an executable action. Domain-specific intents may be defined and/or learned for such natural language inputs that are not directly actionable.

In various examples described herein, domain-specific intents corresponding to natural language inputs that are declarative may be referred to as "declarative intents." Further, in various examples, natural language inputs that are declarative may be referred to as "declarative utterances". However, as used herein, "declarative utterances" may refer to any natural language input (e.g., user speech, user text, keyboard and/or joystick inputs, haptic inputs, motion-activated inputs, etc.) that is non-actionable prior to implementation of the various techniques described herein.

In response to invocation of a declarative intent by an input declarative utterance, a state associated with the declarative intent may be determined. During training, declarative intents may be associated with state data describing states indicated by the declarative user input. For example, for the declarative statement "it's too cold in here" the state data may represent the state "cold." Accordingly, a state may be a condition such as an idea, an environment condition, a state-of-being of the user, a state-of-mind of the user, etc., that is described and/or implied by the declarative user input.

When a declarative intent is invoked via an input declarative utterance, the state data associated with the declarative intent is determined and is input to a concept teaching component effective to learn user-specific relevant actions for the particular state data. The concept teaching component may include a goal-state prediction component. The goal-state prediction component may be a machine learning model (e.g., a classifier) that may predict a goal that may be related to the state data. For example, for the declarative intent "it's too cold in here," the state data "cold" may be input to the goal-state prediction component. In response, the goal-state prediction component may predict the goal data—"increase temperature." The goal data may be provided to another machine learning model (e.g., an action prediction component) that may be effective to predict a particular executable action used to satisfy the predicted goal data. For example, the action prediction component may receive the goal data "increase temperature" and may predict the executable action—"turn on heat" specific to a smart home domain. In some examples, context data such as user account data, device identifier data, global context data (e.g., date, time, geo-location, device location, user settings), etc., may also be used as an input to the machine learning model of the action prediction component and/or the goal-state prediction component, in addition to the state data, in order to predict the action and/or the goal.

After the action prediction component outputs a predicted action, the concept teaching component may initiate a dialog session with the user. For example, the concept teaching component may generate natural language text data (e.g., a natural language prompt) that may be used as output data used to prompt the user whether the action predicted by the action prediction component should be executed. As described in further detail below, the various outputs of the dialog session generated by the concept teaching component may be generated as text that may be displayed on a screen proximate to the user. In another example, the various outputs of the dialog session generated by the concept teaching component may be generated as text that may be output as audio via a text to speech (TTS) component (described in further detail below). In various examples, the dialog session may be turn-based. In a turn-based dialog session, a turn may comprise an output by the natural language processing system and an input by the user (although not necessarily in that order).

During the dialog session, the user may confirm that the predicted action should be executed and/or may instead state another executable action and/or another declarative utterance. If the user suggests another action, the concept teaching component may confirm using a natural language processing component that the user-suggested action is able to be understood and/or that the user-suggested action corresponds to an actionable intent.

In some further examples, a dialog session may comprise multiple turns that involve suggested executable actions by the concept teaching component and clarifying statements by the end user, until a user-desired action is determined. As described in further detail below, the concept teaching component may use the dialog session (as well as context data related to the time of day, the location, the device with which the user is interacting, etc.) to learn what action the user prefers in response to the state data represented in the user's declarative utterance. Upon determining the executable action desired by the user in response to the declarative utterance, the concept teaching component may store concept teaching artifact data that identifies the executable action preferred by the user in association with the state data and/or the relevant context data at a user-account specific location in memory (e.g., in a user-specific database). Thereafter, when the user inputs a declarative utterance with the same state data (e.g., "Computer, it's freezing!" which may be associated with the state data "cold") and/or the same context data, the state data and/or context data may be used by the concept teaching component to look-up the concept teaching artifact. The previously-learned executable action may thereafter be executed. Note that the specific user input need not be identical to the user input that was initially used by the concept teaching component to learn the concept teaching artifact. Instead, if the natural language input is associated with the same state data (e.g., "cold") the learned action may be surfaced using the concept teaching artifact.

Advantageously, the concept teaching techniques described herein allow a natural language processing system to learn personalized executable actions to take in response to declarative utterances. By contrast, machine learning-based personalization techniques use large amounts of data to gradually learn a predicted action over time. Using the techniques described herein, a user may immediately re-invoke the preferred action by speaking the declarative utterance immediately after teaching the natural language processing system the association between the executable action and the declarative utterance.

Text-to-speech (TTS) is a field of computer science, artificial intelligence, and linguistics concerned with enabling computers to output synthesized speech. ASR, NLU, and TTS may be used together as part of a natural language processing system. In some examples, other types of input apart from spoken utterances may be received by a natural language processing system. For example, text, visual input (e.g., facial recognition and/or hand recognition), haptic input, and/or other types of input may be received and/or processed by a natural language processing system.

Spoken language understanding (SLU) is a field of computer science, artificial intelligence, and/or linguistics that receives spoken language as an input, interprets the input, and generates executable commands that may be executed by one or more other computing devices and/or speech processing components. In various examples, spoken language understanding may be a combination of ASR systems and NLU systems, while in other examples, spoken language understanding may be a single model or other type of component effective to perform the functions of both ASR and NLU or otherwise take audio data as an input and output executable commands or other types of instructions representing the meaning of the audio data. In various further examples, SLU may include TTS where a machine learning model may receive input audio data (e.g., request data representing user request data and/or user text input data) and may generate output audio data in response to the utterance.

As used herein, user utterances, input text data, and/or any form of data input to a natural language processing system ("input data") may be described by "natural language inputs" and/or simply "inputs." Such request data may change forms many times during processing of the request data by various components of the speech processing system. For example, initially the input data may be audio data and/or input text data representing a user question. The audio data may be transformed into text data and/or other ASR output data by an ASR component of the speech processing system. The text data and/or other ASR output data may be transformed into intent data by an NLU component of the speech processing system. For example, the declarative intent may be determined for natural language inputs that are not directly actionable (declarative utterances).

For typical, actionable inputs, intent data may be used by a speech processing application (e.g., a speechlet) to perform an action (e.g., to generate action data and/or other speechlet output that may be processed in order to take some corresponding action such as answering a user's question, playing video, playing audio, etc.). Natural language inputs may refer to any data related to an input request to a speech processing system (e.g., including the various data forms described above, as each of the aforementioned data types relate to an input request to the speech processing system). In general, as used herein, speech processing "applications" may be any software (and/or combination of software and hardware) used during speech processing to take an action in response to input request data (e.g., natural language inputs such as user utterances and/or text). Such applications may include speech processing skills, speechlets, and/or other types of speech processing software. Generally, as used herein the term "speechlet" may be used to refer to any code executing on a device that is effective to generate an action in response to a natural language input. For example, speech processing applications (sometimes referred to as "skills") may be generally referred to herein as "speechlets."

In various examples, speech processing systems may determine an intent for particular natural language input according to an interpretation of the natural language input determined by NLU. In various examples, multiple NLU process flows may be executed for a given natural language input as some process flows may be more effective in deriving semantic meaning from particular types of utterances and/or other natural language inputs. For example, a primary NLU process flow may comprise a rule-based heuristic system utilizing knowledge graphs and/or ontological configurations that have been coded in advance. The primary NLU process flow may use a process known as named entity recognition (NER) to identify entities (e.g., nouns and/or pronouns) in a given natural language input. The entities and/or other semantic language data of a natural language input may be parsed and sent to the knowledge graph which, in turn, may be used to relate different entities and/or attributes of those entities (data describing characteristics of the entities) to one another.

FIG. 1 is a diagram of a system 100 configured to determine an executable action in response to a declarative natural language input, according to various embodiments of the present disclosure.

Figure 3:
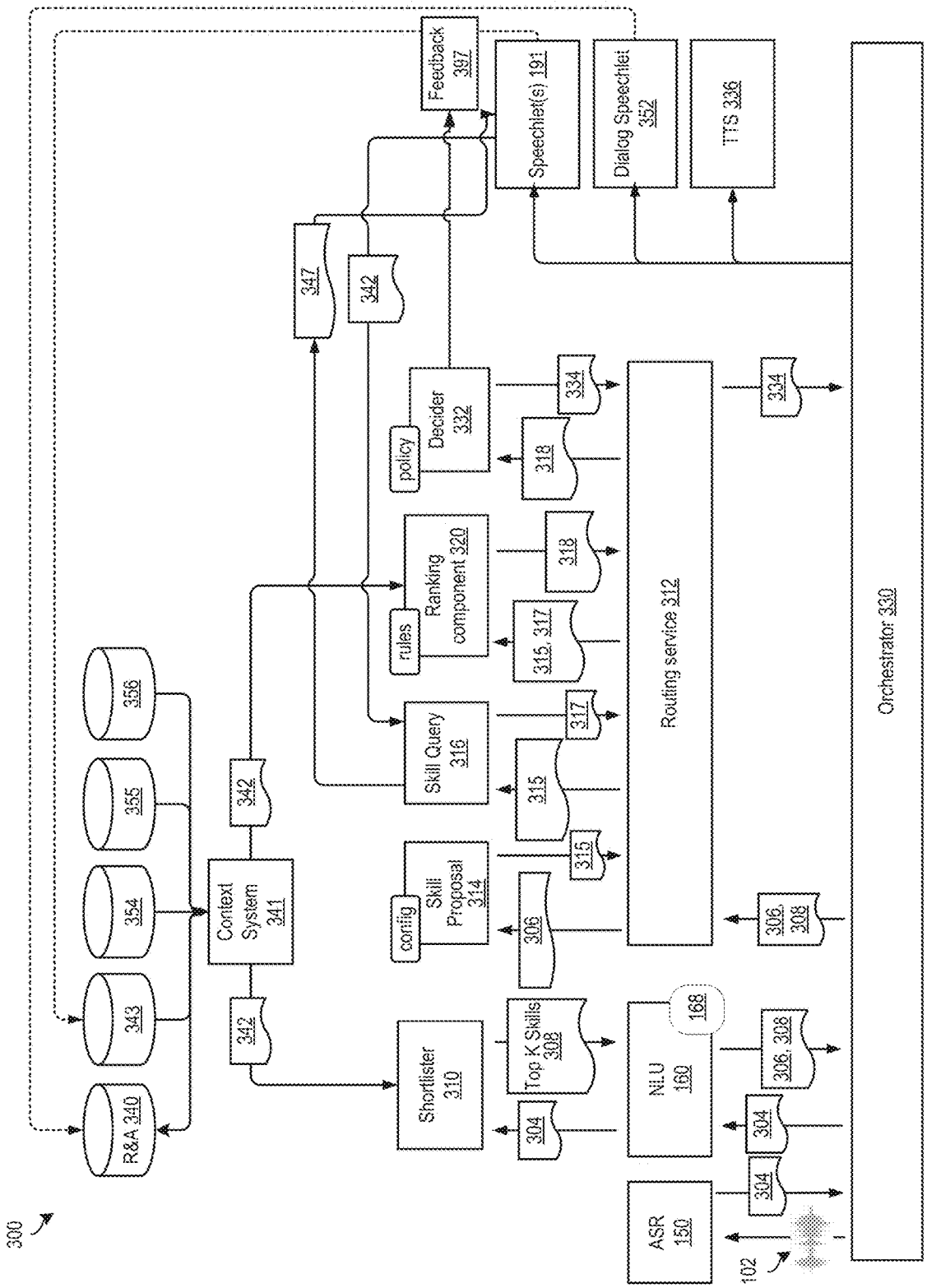
FIG. 3 is a block diagram illustrating an example speech processing system including a concept teaching component for learning executable actions in response to declarative user inputs, in accordance with embodiments of the present disclosure.

In various examples, a user account 101 may communicate with a local device 110. Local device 110 may be a speech-processing enabled device and may be effective to continually "listen" for a wake word. Upon detection of a wake word, input device 110 may record and send audio over network 104 to a natural language processing system 120. Natural language processing system 120 may include one or more computing devices effective to perform various techniques to generate a semantic interpretation of natural language input data and generate responses thereto. Natural language processing system 120 may include fewer or additional components apart from those specifically shown and described in FIG. 1. For example, FIG. 3 depicts an example of a more detailed natural language processing system that may be used in accordance with various aspects of the present disclosure.

In an example, audio data 102 representing a user query may be sent over network 104 to natural language processing system 120. Network 104 may be a wide area network (WAN), such as the Internet, or may be a local area network (LAN). In various other examples, input device 110 may be configured to receive text data and/or may perform speech recognition locally. In such examples, input device 110 may send text data 105 representing natural language input data over network 104 to natural language processing system 120.

In various examples, the audio data 102 may be sent by the natural language processing system 120 to ASR component 150. ASR component 150 may generate text data representing the audio data. The text data representing the audio data 102 may be sent to NLU component 160. In examples where user account 101 provides text input and/or where the input device 110 generates and sends text representing a user utterance, text data 105 may be sent to NLU component 160.

NLU component 160 may employ a number of different natural language understanding strategies, in a federated approach, in order to understand natural language input data. In various examples, NLU component 160 may determine a domain corresponding to a particular natural language input. Domains may be determined using keywords in the input (e.g., using slot data and/or entity recognition) and/or by using context data associated with the natural language input (e.g., device ID, account ID, time, location, etc.). In various examples, non-transitory computer-readable memory 103 may store instructions effective to program at least one processor (e.g., processors and/or processor cores associated with computing devices of natural language processing system 120) to perform the various techniques described in the current disclosure.

Upon determination of a particular domain for the natural language input, NLU component 160 may determine an intent representing the natural language input. In the case of a natural language input that is not directly actionable (a declarative utterance), a domain-specific declarative utterance intent may be determined using a declarative input detector 162 that is specific to the determined domain. Although depicted in FIG. 1 as a separate component, in some examples, the declarative input detector(s) 162 may be part of NLU component 160.

In various examples, the declarative input detector(s) 162 may determine that the natural language input is not directly actionable and corresponds to the declarative intent for the determined domain. In various examples, declarative input detector(s) 162 may include trained machine learning models and/or heuristics that detect declarative utterances. For example, a declarative input detector 162 may be trained using a plurality of declarative input utterances that do not include actionable language, but that are associated with a defined state. For example, training data may include data pairs and/or tuples that include a statement paired together with state data representing a state corresponding to the statement. For example, the statement "Computer, it's too bright in here" may be paired with the state data "too bright" (e.g., (["too bright in [location]", [too_bright]), where ("too bright in [location]" represents the natural language input and [too_bright] represents the state data associated with the natural language input). Accordingly, after training, declarative input detector(s) 162 may be effective to determine state data 112 associated with declarative utterances.

State data 112 may be sent to concept teaching component 168. Concept teaching component 168 may comprise a goal-state prediction component 164, which may be one or more machine learning models effective to receive state data 112 as input and generate a predicted goal as output. The predicted goal output by concept teaching component 168 may represent a prediction of a goal of the user, as determined by the state represented by the state data in the declarative utterance. For example, if the state data 112 represents the state "too cold," goal-state prediction component 164 may generate the predicted goal "increase temperature." Goal-state prediction component 164 may be a machine learning model (e.g., a classifier neural network, etc.) that may be trained in a supervised or unsupervised manner). For example, a classifier may be trained using data pairs comprising state data and predicted actions.

The goal data predicted by goal-state prediction component 164 may be sent to action prediction component 165. Action prediction component 165 may be a machine learning model (e.g., a neural network, etc.) effective to predict an action to be taken based on the goal data and/or based on context data associated with the user account 101's declarative utterance. For example, if the user says "Computer, it's too cold," and the utterance is detected by a device 110 situated in the user's living room, the goal data "increase temperature" and the context data—(living room, 5:37 pm, January 7th) may be used by the action prediction component 165 to predict the action set heat in living room to 77 degrees.

After generating a predicted action associated with the state data, teaching dialog component 166 may initiate a dialog session with user account 101. Initially, the dialog session may comprise a question posed to user account 101 inquiring whether the predicted action should be executed. In an example, if the user desires that the predicted action be performed, the user may affirmatively respond to the initial question of the dialog session. At that point, concept teaching artifact data 169 (CT artifact data 169) may be generated associating the predicted action with the state data, and/or with the context data. The CT artifact data 169 may be stored in a concept database 170 in non-transitory computer-readable memory that is associated with the user account 101, in order to personalize the CT artifact data 169. For example, the CT artifact data 169 may be stored in a database and/or a memory location that is associated with user account 101.

However, if the user instead prefers a different action apart from the predicted action output by action prediction component 165, the user may state the preferred action during the dialog session instituted by teaching dialog component 166. Upon determining during the dialog session the action desired by the user, CT artifact data 169 may be generated associating the action with the state data 112, and/or the context data. As described in further detail below, in some examples, the preferred action determined by the concept teaching component 168 and/or specified by the user during the dialog session may be first sent to NLU 160 to determine if the action is understood and/or is executable by the natural language processing system 120 prior to generating the CT artifact data 169. Accordingly, in some examples, only actions that are both understood and are actionable by the natural language processing system 120 (and/or one or more of the speechlets 191) may be stored in association with state data 112 as CT artifact data 169.

Provided the action is understood and actionable, the action may be executed by the natural language processing system 120 and/or by one or more of speechlets 191. In an example, the audio data 102 may be an audio recording of the statement "Computer, it is too dark in here." The audio data 102 may be translated into corresponding text by ASR component 150. NLU component 160 may determine (e.g., using device ID and/or other context data as well as the input text data) that the utterance corresponds to a smart home domain. Additionally, NLU component 160 (which may include one or more NLU processes specific to the smart home domain) may determine that there is no actionable intent associated with the text data representing the user input "Computer, it is too dark in here." Declarative utterance detector 162 may determine that the utterance corresponds to a declarative intent defined for the smart home domain. Additionally, declarative utterance detector 162 may determine that the state data 112 "too dark" is associated with the particular declarative intent that has been determined for the user input.

The state data 112 "too dark" may be sent to concept teaching component 168. The state data 112 (and/or a suitable representation thereof, such as a feature embedding) may be input into the goal-state prediction component 164. The goal-state prediction component 164 may generate a predicted action. In the current example, the goal-state prediction component 164 may generate the predicted goal data "increase light." The goal data and/or context data (e.g., time of day, date, device ID, etc.) may be sent to the action prediction component 165. The action prediction component 165 may predict an executable action based on the goal data and/or the context data. In an example, the predicted action may be "turn on living room light" for the goal data "increase light" when the context data indicates that it is most likely dark outside (e.g., after 8 pm). However, the predicted action may be "open blinds in living room" for the goal data "increase light" when the context data indicates that it is most likely light outside (e.g., 3 pm and sunny weather forecast, and the user has smart home controlled blinds controllable by a speechlet 191).

In at least some examples, a determination may be made whether or not the predicted action is actionable by one or more of speechlets 191. For example, prior to initiation of a dialog session by teaching dialog component 166, a determination may be made whether a speechlet 191 is effective to execute the action "turn on light."

Assuming the predicted action is executable and/or understood by the natural language processing system 120, teaching dialog component 166 may initiate a dialog session with the user account 101. For example, teaching dialog component 166 may generate the text data "Ok. Would you like for me to turn on the lights in the living room," or similar. The text data may be output via a TTS component as audio. The user may respond to the question. If the user responds affirmatively, the predicted action may be stored in association with the state data 112 as CT artifact data 169 at a user-specific location in concept database 170 (e.g., in a user-specific memory). Thereafter, if the user uses any declarative input that is associated with the same state data 112, the same predicted action may be carried out (e.g., after prompting the user for confirmation that the predicted action should be performed).

Conversely, the user may respond during the dialog session to indicate that the predicted action should not be carried out. In some cases, the user may provide an alternative action and/or a clarifying statement. For example, the user may respond, "No, open the blinds." In some examples, a check may first be performed to determine whether or not NLU 160 understands the user response and/or whether one or more actionable intents correspond to the user response. For example, if there is a speechlet 191 that the user account 101 has enabled that includes an "open the blinds" intent, the concept teaching component 168 may confirm that the user response corresponds to an actionable intent. In such a case, the action indicated by the user response may be stored in association with the state data 112 as CT artifact data 169 in the user-specific concept database 170.

Conceptually, the act of determining and associating an action with state data (e.g., as CT artifact data stored in concept database 170) through a dialog session may be referred to as learning the action for the declarative utterance. Thereafter, when a declarative natural language input (a declarative utterance) is received that invokes a declarative intent that is associated with the same state data 112 and/or with the same context data, the action that is associated with the state data 112 and/or context data via CT artifact data 169 may be executed. In some examples, user confirmation may be used prior to carrying out the action in response to the declarative utterance. For example, if concept teaching component 168 previously learned that the action "open the blinds" (when uttered during the daytime) is associated with the state data "too dark," the next time an utterance is received that is associated with the same state data, the action "open the blinds" may be determined using the CT artifact data 169. In response, the natural language processing system 120 may send the intent data for the "open the blinds" intent to the appropriate speechlet and may execute the "open the blinds" action. In some examples, the natural language processing system 120 may prompt the user prior to executing the action. For example, the natural language processing system 120 may output audio data representing the text "Would you like me to open the blinds?" prior to executing the open the blinds action.

Figure 2:
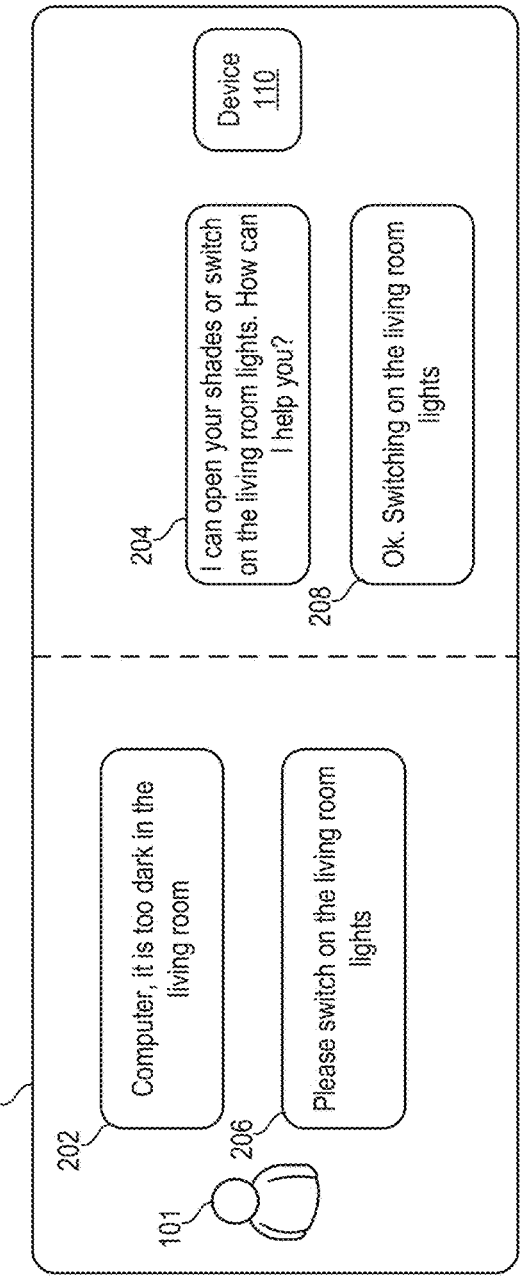
FIG. 2 depicts two example dialog sessions that may be used to determine an executable action in response to a declarative natural language input, in accordance with various embodiments of the present disclosure.
Figure 2:
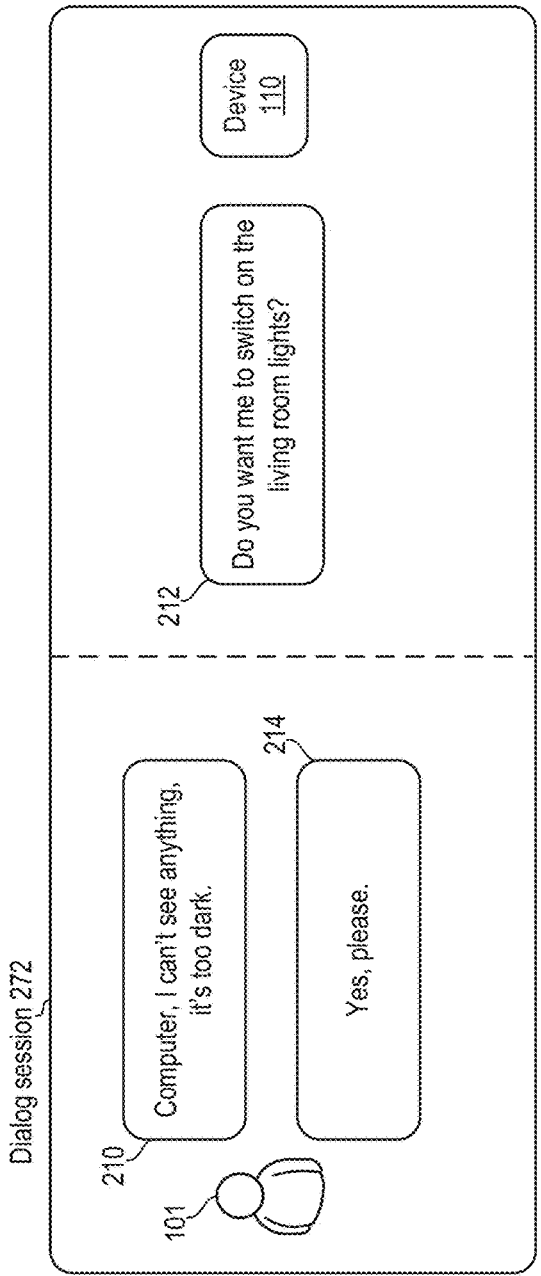

FIG. 2 depicts two example dialog sessions that may be used to determine an executable action in response to a declarative natural language input, in accordance with various embodiments of the present disclosure. In various examples, the concept teaching component 168 and/or, more specifically, the teaching dialog component 166 may carry out teaching session 266 and/or dialog session 272 (corresponding to application of CT artifact data 172 in FIG. 1).

In the example teaching session, the user may initially state "Computer, it is too dark in the living room" as utterance 202. Declarative input detector 162 may determine a domain-specific declarative intent corresponding to the utterance 202 and may determine the state data associated with the declarative intent. Thereafter, the goal-state prediction component 164 of concept teaching component 168 may receive the state data and may generate a predicted goal, and a predicted action based on the predicted goal and the context data associated with the declarative utterance. In the example, the concept teaching component 168 has predicted two actions that may be relevant to the state data. Specifically, the actions "open shades" and "turn on lights." Accordingly, the teaching dialog component may initiate a dialog session and generate the natural language output 204 stating the optional actions. In various examples, natural language output 204 may be output as text and/or audio by speech processing enabled device 110.

In the example depicted in FIG. 2, the user may respond to natural language output 204 with utterance 206, "Please switch on the living room lights." In various examples, NLU component 160 may determine that utterance 206 corresponds to an actionable intent. Accordingly, concept teaching component 168 may store the action "turn on lights" along with the relevant context data in association with the state data "too dark" as CT artifact data 169. Additionally, in various examples, the action may be executed (e.g., by the appropriate speechlet 191) and output text confirming that the action is being taken may be output by the natural language processing system 120. For example, in FIG. 2, the output utterance 208 may be generated to confirm that the living room lights will be turned on as a result of the dialog session (e.g., teaching session 266).

Later, at some point in time after the teaching session 266, dialog session 272 may occur. In the example, user may speak utterance 210, "Computer, I can't see anything, it's too dark." After determining a particular domain for the utterance 210 based on context data and/or based on the text representing the utterance 210, the declarative input detector 162 may determine that the utterance 210 corresponds to a declarative intent (e.g., an intent for declarative utterances for the particular domain). In the example, the declarative intent (and/or the declarative input detector 162) may determine that the utterance is associated with the state data "too dark." Upon receipt of the state data "too dark," the concept teaching component 168 may look up the CT artifact data 169 using the state data "too dark" and/or based on context data associated with the utterance 210. The CT artifact data 169 may associate the state data "too dark" and/or the context data related to the utterance 210 with the executable action "turn on lights" based on the prior teaching session 266. Accordingly, the natural language processing system 120 may output the natural language output 212 comprising the prompt "Do you want me to switch on the living room lights?" As previously described, the natural language output 212 may be output by a speaker and/or display of speech processing enabled device 110.

In the example depicted in FIG. 2, the user may respond to the prompt using utterance 214. Accordingly, the lights may be turned on in the relevant room. In various examples, the relevant room may be determined using context data related to the device ID of device 110. Accordingly, user account 101's declarative utterance may be used to retrieve the action that was previously learned for the user account 101 during teaching session 266.

FIG. 3 is a block diagram illustrating an example speech processing system 300 including a concept teaching component for learning executable actions in response to declarative user inputs, according to various embodiments of the present disclosure.

The various components illustrated in FIG. 3 may be located on the same or different physical devices. The various components illustrated in FIG. 3 may be components of natural language processing system 120. Communication between various components illustrated in FIG. 3 may occur directly or across a network. A speech processing-enabled device may capture audio using an audio capture component, such as one or more microphone(s). The speech processing enabled device may send audio data 102 (e.g., corresponding to an utterance) to an orchestrator 330 of the speech processing system 300. The speech processing enabled device may also send metadata (e.g., including device identifiers, device type data, contextual data, IP address data, room location data, etc.) to the orchestrator 330. The components depicted in FIG. 3, including components of a speech processing system may be generally referred to as spoken language processing components, a speech processing system 300 a spoken language processing system, speech processing components, and/or a speech processing routing system. Additionally, in various examples, the components depicted in FIG. 3 may process written input (e.g., text data) in addition to spoken input.

Upon receipt by the speech processing system 300, the audio data 102 may be sent to an orchestrator 330. The orchestrator 330 may include memory and logic that enables the orchestrator 330 to initiate a dialog session and to transmit various pieces and forms of data to various components of the system, as described in further detail below.

The orchestrator 330 may send the audio data 102 to an ASR component 150 (e.g., a speech recognition component). The ASR component 150 may transcribe the audio data 102 into one or more hypotheses representing speech contained in the audio data 102. The ASR component 150 interprets the speech in the audio data based on a similarity between the characteristics of the audio data corresponding to the speech and pre-established language models. For example, the ASR component 150 may compare the audio data 102 with models for sounds (e.g., subword units such as phonemes) and sequences of sounds to identify words that match the sequence of sounds in the speech represented in the audio data 102. The ASR component 150 may send text data 304 generated thereby to orchestrator 330 that may, in turn, send the text data 304 to NLU component 160 and/or concept teaching component 168. As previously described, the text data 304 may include one or more ASR hypotheses. The text data 304 may include a top scoring hypothesis of the speech represented in the audio data 102 or may include an N-best list including a group of hypotheses of the speech represented in the audio data 102, and potentially respective ASR processing confidence scores. As previously described, in some other examples, the ASR component 150 (and/or other components of the speech processing system 300) may generate other metadata associated with the utterance such as an overall utterance confidence score, per-word (e.g., per token) confidence scores for the utterance, utterance duration, stream duration (e.g., duration of the stream of audio data from speech processing enabled device to speech processing system 300), a number of tokens output by ASR, etc.

The NLU component 160 attempts to make a semantic interpretation of the phrases or statements represented in the text data input therein. That is, the NLU component 160 determines one or more meanings associated with the phrases or statements represented in the text data 304 based on individual words represented in the text data 304. The NLU component 160 interprets a text string to derive an intent of the user (e.g., an action that the user desires be performed and/or a state described by the user) as well as pertinent pieces of information in the text data that allow a device (e.g., the speech processing enabled device, the speech processing system 300, a computing device(s) implementing a speechlet, etc.) to complete the intent. For example, if the text data 304 corresponds to "Set temperature to 74 degrees," the NLU component 160 may determine the user intended to invoke a climate intent with a target temperature value slot of 74 degrees Fahrenheit. A federated NLU approach may be employed in which a number of different NLU strategies are used to determine various NLU output data. The NLU output data may be ranked and the best output (and/or a list of the best NLU outputs) may be sent to downstream components. As previously described, in addition to the NLU intent and slot data, the NLU component 160 may generate other metadata associated with the utterance (e.g., with the audio data 102). Examples of such metadata include, an NLU confidence score for the top intent hypothesis, NLU classification type (e.g., statistical vs. deterministic), NLU slot presence (e.g., data indicating that a particular slot was present), NLU confidence score for the overall top hypothesis (e.g., including the relevant speechlet, intent, and/or slot), entity recognition confidence scores, entity recognition match types (e.g., exact match, prefix match, suffix match, etc.), etc. Herein, the data output by the NLU component 160 (depicted in FIG. 3 as "NLU 160") is referred to as NLU output data 306. Further, as described herein, in some examples the NLU component 160 may determine, for a particular domain, that the utterance does not include an actionable intent. Accordingly, NLU component 160 and/or declarative input detector 162 (FIG. 1) may determine that the natural language input is a declarative utterance.

In some examples, state data associated with a declarative intent may be sent to concept teaching component 168 (which may be part of NLU component 160 and/or which may be a separate speechlet). The concept teaching component 168 may determine a predicted action and/or may initiate a dialog session as previously described.

NLU component 160 may send the text data 304 and/or some of NLU output data 306 (such as intents, recognized entity names, slot values, etc.) to a shortlister 310. The shortlister 310 may comprise one or more machine learning models that may be effective to predict a subset of speechlets that are most likely to be able to correctly process the input data, based on the input of the text data 304 and/or the NLU output data 306. In addition, the shortlister 310 may call the ranking and arbitration component 340 to request features pre-computed by the ranking and arbitration component 340 according to features used as inputs by the machine learning models of shortlister 310. As previously described, the shortlister 310 may define source data used to compute the features and/or may specify functions used to generate the features from the source data (e.g., formulae and/or functions) prior to runtime processing of input data. The ranking and arbitration component 340 may precompute the features according to the specified feature definitions supplied by shortlister 310 and by the other components of speech processing system 300 and may store the precomputed features in memory. Ranking and arbitration component 340 may generate indexes that may be used to retrieve the precomputed features during runtime (e.g., through an API). Accordingly, during runtime processing, shortlister 310 may retrieve the precomputed features from ranking and arbitration component 340 and may use the precomputed features (among other inputs) to predict a subset of speechlets that are most likely to be appropriate to process the current input data. Additionally, the ranking and arbitration component 340 and/or shortlister 310 may determine that a declarative intent and/or the concept teaching component 168 is the appropriate intent/speechlet to handle a particular declarative utterance.

Shortlister 310 may send the top K speechlets 308 to NLU component 160. NLU component 160 may thereafter perform speechlet-specific NLU processing (and/or question-and-answer processing by a question and answer NLU component) for the speechlets in the top K speechlets 308 to determine speechlet-specific intents, slots, and/or named entities. NLU output data 306 may include such speechlet-specific data (e.g., speechlet-specific N-best hypotheses).

Ranking and arbitration component 340 may communicate with various systems in order to obtain source data used to precompute features. For example, ranking and arbitration component 340 may communicate with feedback storage 343 to receive user feedback data (e.g., explicit and/or implicit user feedback related to user satisfaction with processing of input data). In various examples, the user feedback data may be user-specific and/or device specific and may indicate whether a user was satisfied or not satisfied with a particular interaction with speech processing system 300. As previously discussed, in various examples user feedback data may be predicted for input data prior to processing the input data using a speechlet 191. In various examples, user feedback data may be used to pre-compute various features used by machine learning models of speech processing system 300. Accordingly, in some examples, the speechlets selected for processing particular input data may be determined based at least in part on speechlets that a user (or a group of similar users) has responded positively to in the past.

Additionally, ranking and arbitration component 340 may communicate with endpoint context system 354, which may provide context data at the conclusion of a user interaction with the speech processing system 300. In another example, ranking and arbitration component 340 may communicate with speechlet data 356 to determine information from the speechlet regarding past interactions with the speechlet and/or data acquired by the speechlet. Additionally, ranking and arbitration component 340 may communicate with other data sources 355, as new services are added and/or as new data types that may be useful for routing prediction are made available. In addition to ranking and arbitration component 340 using context data 342 to precompute features used by various machine learning models of the routing architecture of the speech processing system 300, a context system 341 may receive the context data 342. The context system 341 may provide the context data directly to both ranking and arbitration component 340 as well as to various components of the routing architecture of speech processing system 300. For example, the context system 341 may send context data 342 to shortlister 310 and/or ranking component 320 in order to determine a shortlist of speechlets 191 for particular input data and/or in order to rank the shortlisted speechlets.

NLU output data 306 (which may, in some examples, include state data associated with a declarative intent and/or a predicted action determined by goal-state prediction component 164) and top K speechlets 308 may be sent by NLU component 160 to orchestrator 330. Orchestrator 330 may send the top K speechlets 308 and the NLU output data 306 to routing service 312. Routing service 312 may send the top K speechlets 308 and NLU output data 306 to speechlet proposal component 314. Speechlets 191 may subscribe to particular intents using speechlet proposal component 314. For example, if state data is used to lookup a personalized action to be taken in response to a declarative utterance (using previously-learned CT artifact data), NLU output data 306 may include sending the specific action's intent to the relevant speechlet 191 (e.g., as described below).

Accordingly, speechlet proposal component 314 may receive the NLU output data 306 and may determine whether any of the included intents correspond to one or more of speechlets 191. If so, speechlet proposal component 314 may generate candidate data comprising <Intent, Speechlet> candidate pairs 315. The candidate pairs 315 may be sent to routing service 312 and may be sent by routing service 312 to speechlet query service 316. Speechlet query service 316 comprises an API through which speechlets 191 may "opt out" of particular requests. For example, a speechlet 191 may comprise a video playback speechlet. Accordingly, the speechlet 191 may register with speechlet query service 316 to indicate that only requests made on a device with a display screen should be routed to the particular speechlet 191. In addition, speechlets 191 may communicate availability information, pricing information, and/or other structured descriptions of how and under what circumstances (e.g., determined using context data) the speechlet 191 can fulfill a request represented by the current input data. Speechlet query service 316 may send a signal 317 indicating what speechlets can fulfill a particular request (and/or what speechlets are unable to fulfill the request). The signal 317 may be sent to routing service 312. Routing service 312 may send the signal 317 along with the candidate pairs 315 to a ranking component 320. As depicted in FIG. 3, speechlets 191 may send context data 342 to speechlet query service 316 to indicate situations in which a speechlet may opt out of processing a particular request (e.g., if the device sending the input data does not include a display screen, etc.). In various examples, the context data 342 sent by speechlets 191 to speechlet query service 316 may be speechlet and/or request specific context data. Additionally, speechlet query service 316 may send intent requests 347 to speechlets 191.

Ranking component 320 may include one or more statistical machine learning models effective to rank the candidates included in candidate pairs 315. In order to rank the candidate pairs 315, ranking component 320 may generate confidence scores for each corresponding candidate pairs 315. A confidence score may indicate that the corresponding speechlet 191 and/or intent of the candidate pair is appropriate to process the request. Ranking component 320 may compute features using the candidate pairs 315 and signal 317 in order to predict the ranking of the speechlets 191 included in the candidate pairs 315. The features computing during processing of the input data (sometimes referred to as "runtime features") may comprise a feature representation of the list of candidate pairs 315 and/or a representation of the signal 317. Additionally, ranking component 320 may query ranking and arbitration component 340 for precomputed features that have been defined for use by ranking component 320. As previously described, the precomputed features may be determined based on contextual data, user feedback data, past usage data, speechlet data, previous rankings of ranking component 320, etc. Additionally, ranking component 320 may compute runtime features using context data 342, user feedback data from feedback storage 343, and/or other data sources. In various examples, the loss function for the machine learning models of ranking component 320 may optimize based on user satisfaction scores computed using user feedback data from feedback storage 343.

Ranking component 320 may generate a ranked list 318 of the candidate speechlets indicated in candidate pairs 315. In at least some examples, the ranking component 320 may use a deep neural network as a machine learning model for determining the ranked list 318. In some examples, ranking component 320 (and/or some other speech processing system 300 component, such as decider engine 332) may determine plan data that may override the ranked list 318 such that a lower ranked speechlet among the candidate pairs 315 may be selected for processing the input data.

In another example, the decider engine 332 may store policies that may control whether or not explicit user feedback is solicited (e.g., via TTS) after the completion of an action (e.g., by the top-ranked speechlet determined by the ranker component). Explicit feedback may be solicited through the dialog speechlet 352 prior to routing input data to a speechlet for processing. In another example, decider engine 332 may control feedback component 397 to request explicit feedback from a user post-speechlet processing (e.g., via TTS). In various examples, feedback component 397 may ask the user whether or not the user was satisfied with the action taken by the speech processing system 300. In yet another example, an exploration policy defining a dynamic routing adjustment may send input data that matches predicate data defined using the dynamic routing adjustment component to a newly-implemented speechlet 191. The decider engine 332 may determine that the top ranked result from the ranking component 320 should be ignored due to the dynamic routing adjustment being performed by the dynamic routing adjustment component. Additionally, in some examples, a policy of the decider engine 332 may be to solicit explicit feedback from the user whenever a new speechlet is routed to due to a dynamic routing adjustment. Accordingly, at the completion of the action, the decider engine 332 may control TTS to inquire as to whether the user was satisfied with the interaction with the new speechlet and/or whether the performed action was the action intended by the user. Decider engine 332 may output plan data that comprises a routing plan 334 for processing the input data. The routing plan 334 may define a target speechlet 191 (and/or may identify concept teaching component 168) to process the input data. As described above, the target speechlet 191 may be selected as the top-ranked hypothesis determined by the ranking component 320. In some other examples, the decider engine 332 may select a target speechlet 191 based on a policy, as described above. In some examples, the ranking component 320 may determine that two different speechlets are equally applicable for processing the input data. In such examples, the decider engine 332 may determine that disambiguation should occur. Accordingly, the routing plan 334 may include sending the input data to a dialog speechlet 352 that may output (via TTS) one or more questions (e.g., a disambiguation request) used to prompt the user to disambiguate between the two equally likely (or approximately equally likely) interpretations of the input data. In various examples, teaching dialog component 166 may be implemented as a dialog speechlet 352. For example, it may be unclear, based on a user's request, whether the user intended to invoke a movie playback speechlet or a music playback speechlet, as a movie and a soundtrack for the movie may be identified using the same name. Accordingly, the decider engine 332 may determine that the top two hypotheses of ranking component 320 are equally likely (or approximately equally likely) and may determine that a question should be asked to disambiguate between the two possible actions. Accordingly, the routing plan 334 may route the input data to the dialog speechlet 352, and the dialog speechlet 352 may inquire whether the user intended to play the movie or the soundtrack.

In another example, the decider engine 332 may determine that the user was not satisfied with the top hypothesis of the ranking component 320 (e.g., due to explicit or implicit feedback received from the user in response to taking an action associated with the top ranking component 320 hypothesis). Accordingly, the decider engine 332 may determine that the routing plan 334 should be to determine the second highest ranked hypothesis of the ranking component 320.

If a speechlet 191 outputs natural language text in response to processing, the orchestrator may send the text to TTS component 336 for output as audio representing the speech.

Figure 4:
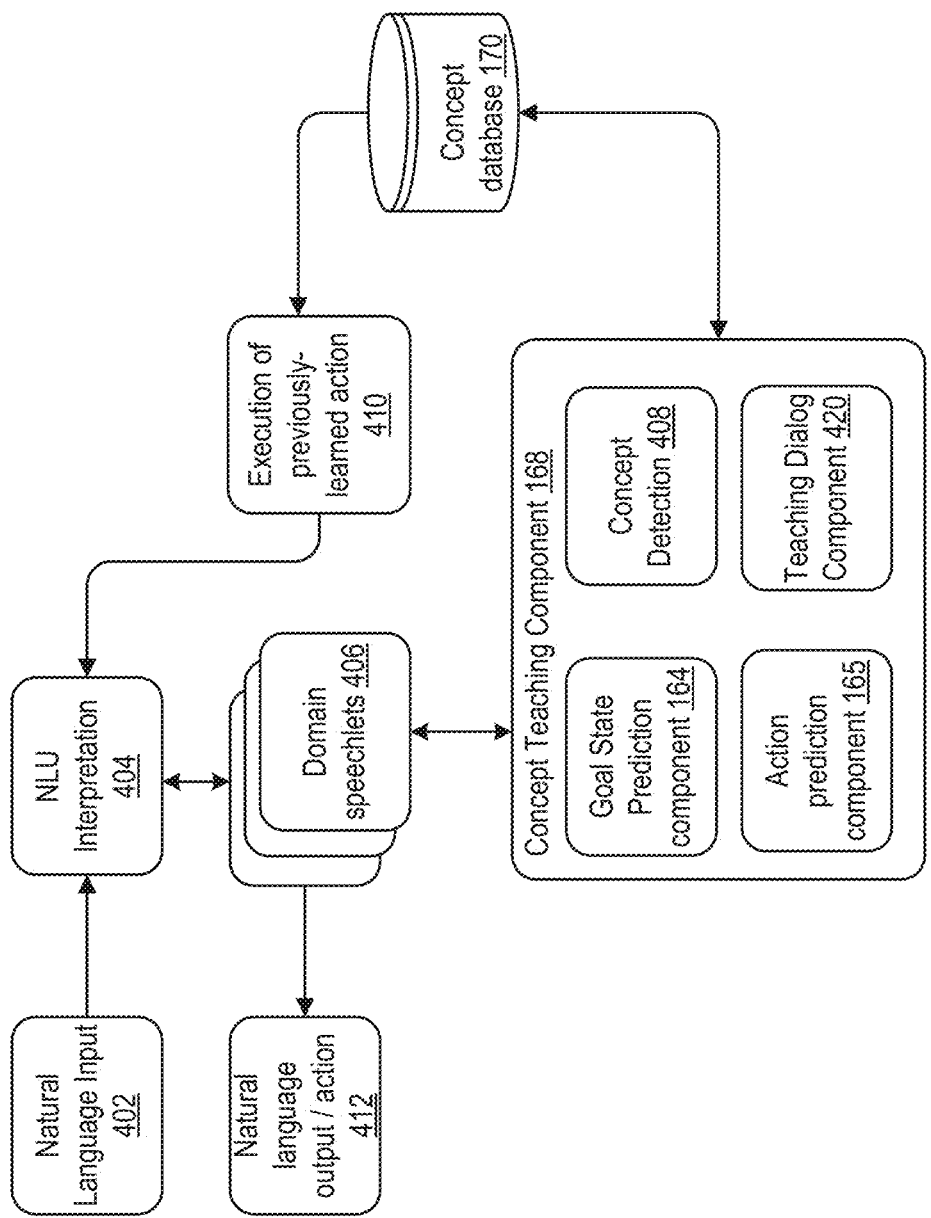
FIG. 4 depicts a block diagram illustrating an example of execution of a previously-taught action in response to a declarative natural language input, in accordance with various aspects of the present disclosure.

FIG. 4 depicts a block diagram illustrating an example of execution of a previously-taught action in response to a declarative natural language input, in accordance with various aspects of the present disclosure.

In the example depicted in FIG. 4, a natural language input 402 is received. An NLU interpretation 404 is determined for the natural language input 402. In various examples, the NLU interpretation 404 may be used to determine a particular domain speechlet 406 that may be used to further process the NLU interpretation 404 to determine an intent. In various examples, if the NLU interpretation 404 is determined to include actionable content (e.g., a named entity, slot data, words invoking a specific intent and/or speechlet, etc.), intent data related to the actionable content may be determined and the intent data may be used to execute the appropriate action by the domain speechlet 406 to generate natural language output/action 412. Conversely, if a declarative intent is determined (e.g., a determination is made that the natural language input 402 is a declarative natural language input), the state data associated with the declarative intent may be sent to concept teaching component 168.

Goal-state prediction component 164 may use the state data to determine a predicted goal associated with the state. As previously described, action prediction component 165 may receive the predicted goal data and/or context data associated with the declarative utterance to predict an action. Teaching dialog component 420 may initiate a dialog session that may be used to determine whether the predicted action should be executed in response to the declarative utterance and/or that a different action should be taken, as previously described.

In some other examples, the state data may be sent to concept detection component 408. Concept detection component 408 may be used to lookup previously learned concepts. For example, concept detection component 408 may use the state data as a search query to query concept database 170 for concepts previously learned by concept teaching component 168. As previously described, the concept database 170 may be specific to a user and thus may store personalized concepts and/or actions. If the state data is associated with a previously-learned action, data identifying the action may be returned. Accordingly, the previously-learned action may be executed at block 410 by sending the action to either the NLU component 160 and/or to the appropriate domain speechlet 406 and/or speechlet 191. As previously described, a determination may be made whether the NLU component 160 and/or the domain speechlets 406 are able to understand and/or execute the action prior to storing the action data identifying the action in concept database 170.

Figure 5:
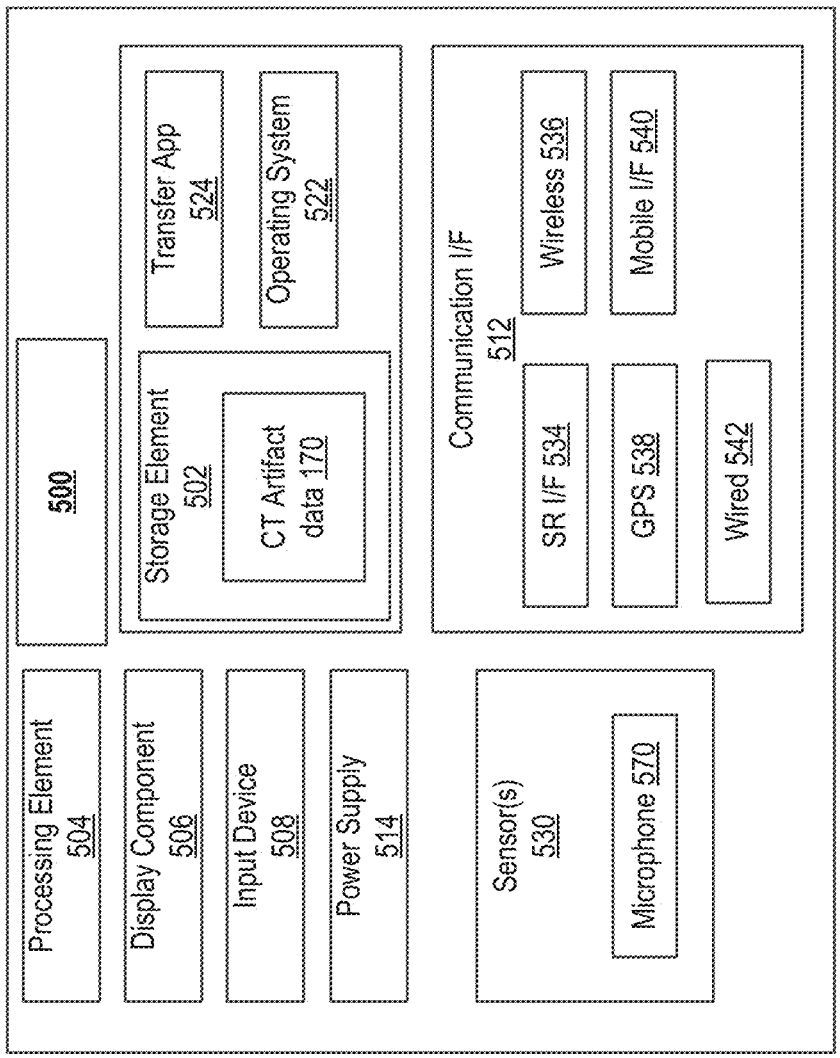
FIG. 5 is a block diagram showing an example architecture of a computing device that may be used to generate natural language responses to declarative natural language inputs, in accordance with various embodiments described herein.

FIG. 5 is a block diagram showing an example architecture 500 of a computing device that may be used to access and/or implement natural language processing system 120, in accordance with various aspects of the present disclosure. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). The storage element 502 can include one or more different types of memory, data storage, or computer-readable memory devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc. Additionally, storage element 502 may store machine learned models used in natural language processing (and/or parameters thereof), various NLU models, knowledge graphs, response templates, FSTs, etc.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor and/or microphone included in the architecture 500.

When implemented in some user devices, the architecture 500 may also comprise a display component 506 and/or be configured in communication with one or more external display components 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone or an array of microphones for capturing sounds, such as voice requests. In various examples, audio captured by microphone 570 may be streamed to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as the network 104, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. As noted above, multiple devices may be employed in a single system. In such a multi-device system, each of the devices may include different components for performing different aspects of the system's processing. The multiple devices may include overlapping components. The components of the natural language processing system 120, as described herein, are exemplary, and may be located as a stand-alone device or may be included, in whole or in part, as a component of a larger device or system.

Figure 6:
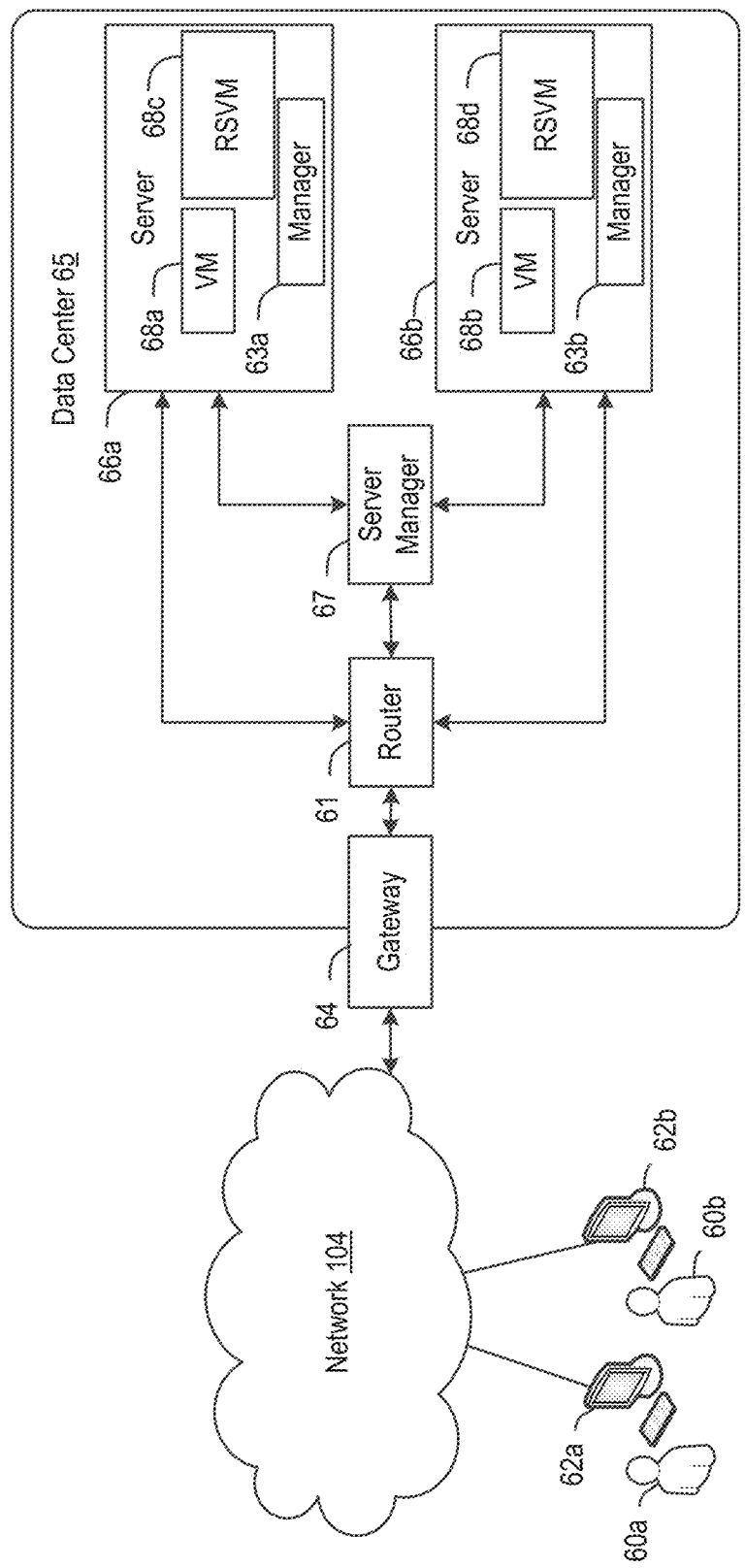
FIG. 6 is a diagram illustrating an example system for sending and providing data that may be used in accordance with the present disclosure.

An example system for sending and providing data and processing data of natural language processing systems will now be described in detail. In particular, FIG. 6 illustrates an example computing environment in which the embodiments described herein may be implemented. For example, the computing environment of FIG. 6 may be used to provide natural language processing as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60a and 60b (which may be referred herein singularly as user 60 or in the plural as users 60) via user computers 62a and 62b (which may be referred herein singularly as user computer 62 or in the plural as user computers 62) via network 104. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources, and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. In various examples, the instances may be configured to execute one or more of the various natural language processing techniques described herein.

These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 65 may include servers 66a and 66b (which may be referred herein singularly as server 66 or in the plural as servers 66) that provide computing resources. These resources may be available as bare metal resources or as virtual machine instances 68a-d (which may be referred herein singularly as virtual machine instance 68 or in the plural as virtual machine instances 68). In at least some examples, server manager 67 may control operation of and/or maintain servers 66. Virtual machine instances 68c and 68d are rendition switching virtual machine ("RSVM") instances. The RSVM virtual machine instances 68c and 68d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63a or 63b (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66a and 66b. Router 61 may also be connected to gateway 64, which is connected to network 104. Router 61 may be connected to one or more load balancers, and alone or in combination may manage communications within networks in data center 65, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66a and 66b. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location, or other attributes associated with user computers 62, a nature of a task with which the communications are associated, a priority of a task with which the communications are associated, a duration of a task with which the communications are associated, a size and/or estimated resource usage of a task with which the communications are associated and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway, or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, used to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example computer servers, storage devices, network devices and the like. In some embodiments, a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments, the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations, inexpensive and low latency network connectivity may be provided between resource instances that reside within the same geographical region (and network transmissions between resources of the same availability zone may be even faster).

Figure 7:
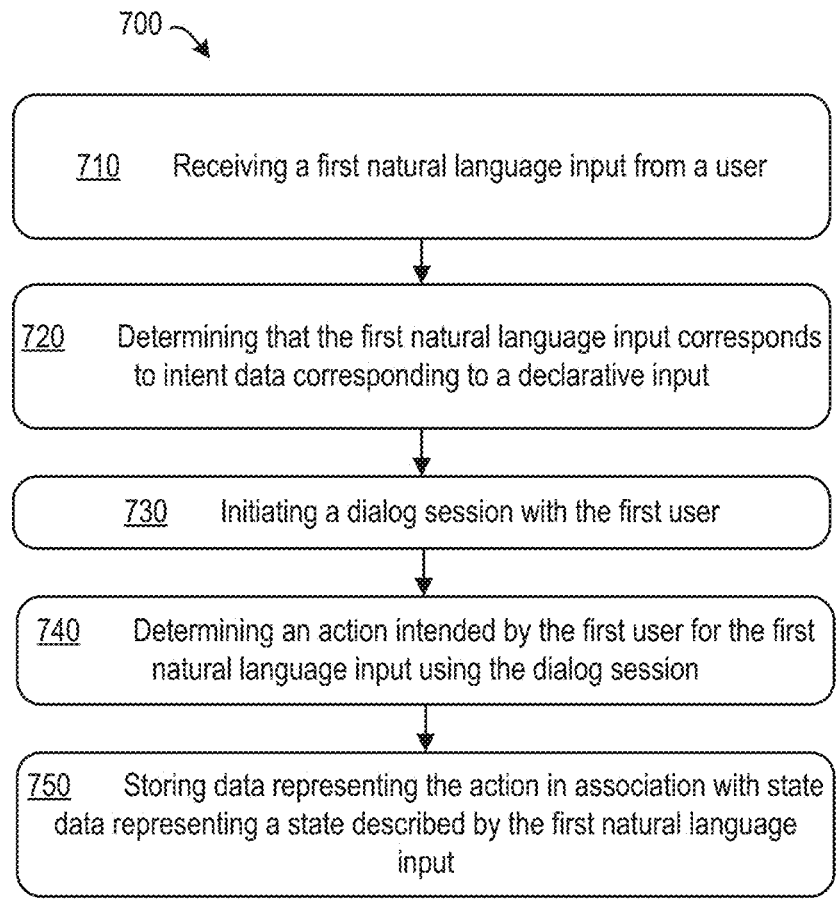
FIG. 7 depicts a flow chart showing an example process for learning a user-specific action to take in response to a declarative natural language input, in accordance with various aspects of the present disclosure.

FIG. 7 depicts a flow chart showing an example process 700 for learning a user-specific action to take in response to a declarative natural language input, in accordance with various aspects of the present disclosure. Those portions of FIG. 7 that have been previously discussed in reference to FIGS. 1-6 may not be described again for purposes of clarity and brevity. The actions of the process 700 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 700 of FIG. 7 may begin at action 710, at which a first natural language input from a user may be received. In various examples, the first natural language input may be speech or text representing a user's declarative statement. Any declarative statement that describes a state without presenting a directly-actionable question, request, command, etc. For example, the user may state "Computer, my feet itch." The utterance includes a state (e.g., "itching feet"), but it may not correspond to any currently actionable intents of the natural language processing system.

Processing may continue from action 710 to action 720, at which a determination may be made that the first natural language input corresponds to intent data corresponding to a declarative input. At action 720, a determination may be made that the first natural language input corresponds to a declarative intent. For example, one or more entities included in the intent and/or slot data included in the intent may be associated with a particular declarative intent. During training, declarative intents may be associated with state data.

Processing may continue from action 720 to action 730, at which a dialog session may be initiated with the first user. In various examples, the dialog session may be initiated by the natural language processing system 120 outputting audio and/or text that asks the user whether or not an action predicted by action predicted component 165 based on goal data predicted by goal-state prediction component 164 and/or relevant context data should be performed. As previously described the goal data may be predicted based on state data associated with the declarative intent. The action may be predicted based on the goal data and/or based on context data associated with the user's natural language input (e.g., with the user's declarative utterance). In at least some examples, the action may be an action that ameliorates a state described by the first natural language input and/or is related to the goal data. In at least some examples, prior to prompting the user regarding the predicted action during the dialog session, the concept teaching component 168 may first determine whether or not the action can be understood by NLU component 160 and/or whether any actionable intents correspond to the predicted action.

Processing may continue from action 730 to action 740, at which an action intended by the first user for the first natural language input may be determined using the dialog session. For example, the user may respond affirmatively to a suggested action (e.g., the predicted action) during the dialog session. In another example, the user may reject a suggested action and may instead state a preferred action. In at least some examples, NLU component 160 may be used to determine whether or not an action suggested by the user and/or determined by the concept teaching component 168 is both understood and/or actionable by the natural language processing system.

Processing may continue from action 740 to action 750, at which data representing the action may be stored in association with state data representing the state described in the first natural language input. The data may be a concept teaching artifact 169 representing the natural language processing system 120 learning that the first user prefers a certain action in response to declarative utterances related to a particular state. For example, a particular user may want to turn on the air conditioning whenever the user says anything about the heat (e.g., with state data "too hot").

Figure 8:
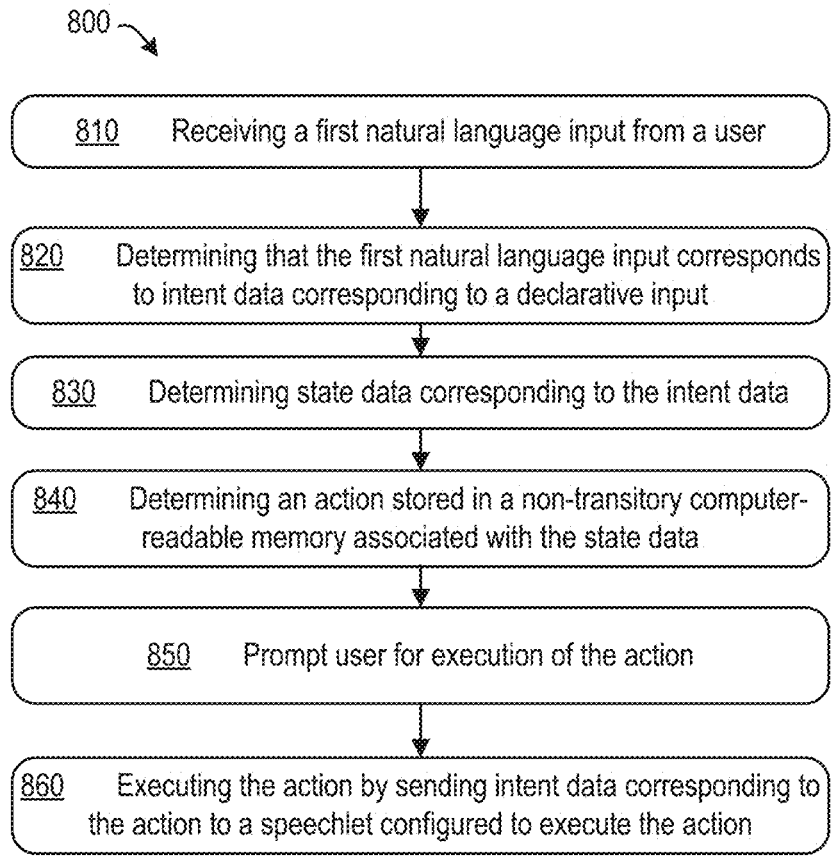
FIG. 8 depicts a flowchart showing an example process for executing a user-specific action in response to a declarative natural language input, in accordance with various aspects of the present disclosure.

FIG. 8 depicts a flowchart showing an example process for executing a user-specific action in response to a declarative natural language input, in accordance with various aspects of the present disclosure. Those portions of FIG. 8 that have been previously discussed in reference to FIGS. 1-7 may not be described again for purposes of clarity and brevity. The actions of the process 800 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 800 of FIG. 8 may begin at action 810, at which first natural language input may be received from a user. In various examples, the first natural language input may be speech or text representing a user's declarative statement. Any declarative statement that describes a state without presenting a directly actionable question, request, command, etc. For example, the user may state "Computer, I am home." The utterance includes a state (e.g., "user is home"), but it may not correspond to any currently actionable intents of the natural language processing system.

Processing may continue from action 810 to action 820, at which a determination may be made that the first natural language input corresponds to intent data corresponding to a declarative input. At action 820, a determination may be made that the first natural language input corresponds to a declarative intent. For example, one or more entities included in the intent and/or slot data included in the intent may be associated with a particular declarative intent. During training, declarative intents may be associated with state data. For example, a declarative intent may be associated with the state data "[user] is home."

Processing may continue to action 830, at which state data corresponding to the intent data may be determined. The state data may be determined during training when the various declarative intents are learned. For example, the state data may be data describing a state indicated by the user's utterance. Thereafter, whenever the user makes a declarative statement to the natural language processing system 120 that invokes the same state, the same declarative intent may be determined. For example, the user utterances "I'm cold," "I'm freezing," "It's ice cold," "It's too cold," "It's freezing," etc., may all correspond to a declarative intent with corresponding state data "cold."

Processing may continue from action 830 to action 840, at which an action stored in a non-transitory computer-readable memory that is associated with the state data and/or with context data associated with the user's declarative utterance may be determined. At action 840, the state data determined at action 830 may be used to lookup an action that has previously been associated with that state and/or with the context data for the particular user account and/or device identifier associated with the first natural language input received at action 810. The state data may be associated with the action via CT artifact data 169. The CT artifact data 169 may be stored in user-specific memory and may thus be personalized for the user (or for the device or the account from which the first natural language input was received). The CT artifact data 169 may represent that the natural language processing system 120 has learned a particular action for a particular class of declarative utterances (e.g., those utterances associated with the particular state data stored as part of the CT artifact data 169).

Processing may continue from action 840 to action 850, at which the user may be prompted to determine whether or not the user wants the action determined at action 840 to be executed. If the user confirms that the action should be executed, processing may continue from action 850 to action 860, at which the action determined at action 840 may be executed by sending intent data corresponding to the action to a speechlet configured to execute the action.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary speechlet in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method comprising:
   receiving, by a natural language processing system at a first time, first natural language input data representing a declarative statement from a device associated with a user profile;
   determining, by the natural language processing system, that the first natural language input data corresponds to a declarative intent;
   determining first state data indicated by the declarative intent, the first state data representing an environmental condition associated with the first natural language input data;
   determining a predicted action corresponding to the first state data;
   generating first output data comprising a prompt to inquire if the predicted action is intended;
   receiving second natural language input data, wherein the second natural language input data represents an action requested by a user that is different from the predicted action;
   storing, in a non-transitory computer-readable memory, data associated with the user profile and the data representing the action in association with the first state data;
   receiving, by the natural language processing system at a second time after the first time, third natural language input data;
   determining, by the natural language processing system, that the third natural language input data corresponds to the declarative intent;
   determining that the third natural language input data corresponds to the first state data;

determining that the first state data is associated with the data representing the action in the non-transitory computer-readable memory; and executing the data representing the action to generate a first output.

2. The method of claim 1, further comprising:

receiving, by the natural language processing system, fourth natural language input data;

determining, by the natural language processing system, that the fourth natural language input data corresponds to the declarative intent;

determining second state data for the fourth natural language input data;

determining a second predicted action corresponding to the second state data;

generating second output data comprising a second prompt to inquire if the second predicted action is intended;

receiving, by the natural language processing system, fifth natural language input data;

determining from the fifth natural language input data that the second state data corresponds to the first state data;

determining that the first state data is associated with the data representing the action in the non-transitory computer-readable memory; and executing the data representing the action to generate the first output.

3. The method of claim 1, further comprising:

receiving, by the natural language processing system, fourth natural language input data representing a second declarative statement associated with a second user profile;

determining, by the natural language processing system, that the fourth natural language input data corresponds to the declarative intent for declarative utterances;

determining that the fourth natural language input data corresponds to the first state data;

determining that the first state data is associated with second data associated with the second user profile, the second data representing a different action; and executing the second data representing the different action to generate a second output different from the first output.

4. A method comprising:

receiving first input data representing a first natural language declarative statement;

determining that the first input data corresponds to a declarative intent;

determining, based at least in part on the first input data corresponding to the declarative intent, first data representing a first state described by at least a portion of the first input data;

generating, by a first machine learning model, second data based at least in part on the first data, wherein the second data represents a predicted action for the first natural language declarative statement;

generating output data representing a request for clarification based at least in part on the predicted action;

receiving second input data representing a response to the request for clarification;

determining an action intended to be taken in response to the first input data based at least in part on the second input data and the first input data;

storing the first data representing the first state in association with third data representing the action in a first data structure;

receiving third input data representing a second natural language declarative statement different from the first natural language declarative statement;

determining that the third input data corresponds to the declarative intent;

determining fourth data representing a second state described by at least a portion of the second natural language declarative statement;

determining that the second state corresponds to the first state;

receiving, from the first data structure, the third data representing the action; and generating a natural language prompt as output data, the natural language prompt representing a prompt for executing the action.

5. The method of claim 4, further comprising:

receiving fourth input data, the fourth input data requesting a different action; and storing fifth data representing the different action in association with the first data based at least in part on the fourth input data.

6. The method of claim 4, wherein the first state comprises a first condition described by at least a portion of the first natural language declarative statement, the method further comprising:

generating second output data representing a prompt inquiring whether the predicted action is to be executed; and receiving fourth input data indicating that the action is to be executed, wherein the action is different from the predicted action, wherein storing the third data representing the action is performed based at least in part on the fourth input data.

7. The method of claim 4, further comprising:

receiving fifth data describing a context of the first input data;

determining a first domain associated with the first input data based at least in part on the fourth fifth data; and determining the declarative intent from among intents associated with the first domain.

8. The method of claim 4, further comprising:

receiving metadata indicating an account associated with the first input data;

determining at least one address in memory associated with the account; and storing fifth data representing the action in association with sixth data representing the first natural language declarative statement at the at least one address in memory.

9. The method of claim 4, wherein the first state comprises a first condition of an environment described by at least a portion of the first natural language declarative statement, the method further comprising:

receiving fourth input data;

determining fifth data representing a third state described by at least a portion of the fourth input data, wherein the third state describes a second condition of the environment;

determining that the first state corresponds to the third state; and storing the fifth data in association with the action and the first data.

10. The method of claim 4, further comprising:

receiving fifth data describing a context of the first input data;

determining, by the first machine learning model using the first data and the fifth data, the second data representing the predicted action; and determining, by a second machine learning model using the first data and the second data, the third data representing the action.

11. A system comprising:

at least one processor; and at least one non-transitory computer-readable memory storing instructions that, when executed by the at least one processor, are effective to program the at least one processor to:

receive first input data representing a first natural language declarative statement;

determine that the first input data corresponds to a declarative intent;

determine, based at least in part on the first input data corresponding to the declarative intent, first data representing a first state described by at least a portion of the first input data;

generate, by a first machine learning model, second data based at least in part on the first data, wherein the second data represents a predicted action for the first natural language declarative statement;

generate output data representing a request for clarification based at least in part on the predicted action;

receive second input data representing a response to the request for clarification;

determine an action intended to be taken in response to the first input data based at least in part on the second input data and the first input data;

store the first data representing the first state in association with third data representing the action in a first data structure;

receive third input data representing a second natural language declarative statement different from the first natural language declarative statement;

determine that the third input data corresponds to the declarative intent;

determine fourth data representing a second state described by at least a portion of the second natural language declarative statement;

determine that the second state corresponds to the first state;

receive, from the first data structure, the third data representing the action; and generate a natural language prompt as output data, the natural language prompt representing a prompt for executing the action.

12. The system of claim 11, the at least one non-transitory computer-readable memory storing further instructions that, when executed by the at least one processor, are further effective to program the at least one processor to:

receive fourth input data, the fourth input data requesting a different action; and store fifth data representing the different action in association with the first data based at least in part on the fourth input data.

13. The system of claim 11, wherein the first state comprises a first condition described by at least a portion of the first natural language declarative statement, the at least one non-transitory computer-readable memory storing further instructions that, when executed by the at least one processor, are further effective to program the at least one processor to:

generate second output data representing a prompt inquiring whether the predicted action is to be executed; and receive fourth input data indicating that the action is to be executed, wherein the action is different from the predicted action, wherein storing the third data representing the action is performed based at least in part on the fourth input data.

14. The system of claim 11, the at least one non-transitory computer-readable memory storing further instructions that, when executed by the at least one processor, are further effective to program the at least one processor to:

receive fifth data describing a context of the first input data;

determine a first domain associated with the first input data based at least in part on the fifth data; and determine the declarative intent from among intents associated with the first domain.

15. The system of claim 11, the at least one non-transitory computer-readable memory storing further instructions that, when executed by the at least one processor, are further effective to program the at least one processor to:

receive metadata indicating an account associated with the first input data;

determine at least one address in memory associated with the account; and store fifth data representing the action in association with sixth data representing the first natural language declarative statement at the at least one address in memory.

16. The system of claim 11, the at least one non-transitory computer-readable memory storing further instructions that, when executed by the at least one processor, are further effective to program the at least one processor to:

receive fifth data describing a context of the first input data;

determine, by the first machine learning model using the first data and the fifth data, the second data representing the predicted action; and determine, by a second machine learning model using the first data and the second data, the third data representing the action.

* * * * *